(12) United States Patent
Nijdam et al.

(10) Patent No.: US 10,317,002 B2
(45) Date of Patent: Jun. 11, 2019

(54) VIBRATION ISOLATING INSERT FOR A PIPE CLIP AND METHOD FOR MANUFACTURING SUCH AN INSERT

(71) Applicant: J. van Walraven Holding B.V., Mijdrecht (NL)

(72) Inventors: Frank Nijdam, Zeewolde (NL); Constantinus Paulinus Johannes Maria Vermeulen, Rotterdam (NL)

(73) Assignee: J. van Walraven Holding B.V., Mijdrecht (NL)

( * ) Notice: Subject to any disclaimer, the term of this patent is extended or adjusted under 35 U.S.C. 154(b) by 40 days.

(21) Appl. No.: 15/517,649

(22) PCT Filed: Sep. 21, 2015

(86) PCT No.: PCT/NL2015/050656
§ 371 (c)(1),
(2) Date: Apr. 7, 2017

(87) PCT Pub. No.: WO2016/056895
PCT Pub. Date: Apr. 14, 2016

(65) Prior Publication Data
US 2018/0003327 A1   Jan. 4, 2018

(30) Foreign Application Priority Data

Oct. 8, 2014   (NL) .................................... 2013596

(51) Int. Cl.
*F16M 13/00*   (2006.01)
*F16L 55/035*   (2006.01)
(Continued)

(52) U.S. Cl.
CPC .......... *F16L 55/035* (2013.01); *B29C 47/003* (2013.01); *B29C 47/04* (2013.01); *F16L 3/12* (2013.01)

(58) Field of Classification Search
CPC ...... F16L 55/035; F16L 17/04; B29C 47/003; B29C 47/04
(Continued)

(56) References Cited

U.S. PATENT DOCUMENTS 5,018,768 A *  5/1991  Palatchy ................. F16L 17/04
                                                        24/284
6,226,933 B1 *  5/2001  Nelson ................... A01G 13/10
                                                        43/124
6,518,684 B1 *  2/2003  Schaich .............. F04C 15/0061
                                                        310/103

FOREIGN PATENT DOCUMENTS

DE   102007052701 A1   5/2009
EP        0413883 A1   3/1990
EP        2133617 A1  12/2009

* cited by examiner

*Primary Examiner* — Todd M Epps
(74) *Attorney, Agent, or Firm* — Hoffman & Baron, LLP

(57) ABSTRACT

A vibration-isolating insert for a pipe clip is adapted to bear against an inner circumference of a substantially annular pipe clip body and ultimately, in use, to be positioned between the outer circumference of a pipe and the pipe clip body. The vibration-isolating insert includes an elongate strip of vibration-isolating material which has a pipe facing side and a pipe clip facing side. The strip of vibration-isolating material has adjacent either lateral edge thereof a series of discrete exposed hooks of plastics material which is more rigid than the vibration-isolating material. The hooks protrude relative to the pipe clip facing side of the strip of vibration-isolating material.

14 Claims, 2 Drawing Sheets

(51) Int. Cl.
*F16L 3/12* (2006.01)
*B29C 47/00* (2006.01)
*B29C 47/04* (2006.01)

(58) Field of Classification Search
USPC .................. 248/636, 65, 74.1, 74.2; 285/420
See application file for complete search history.

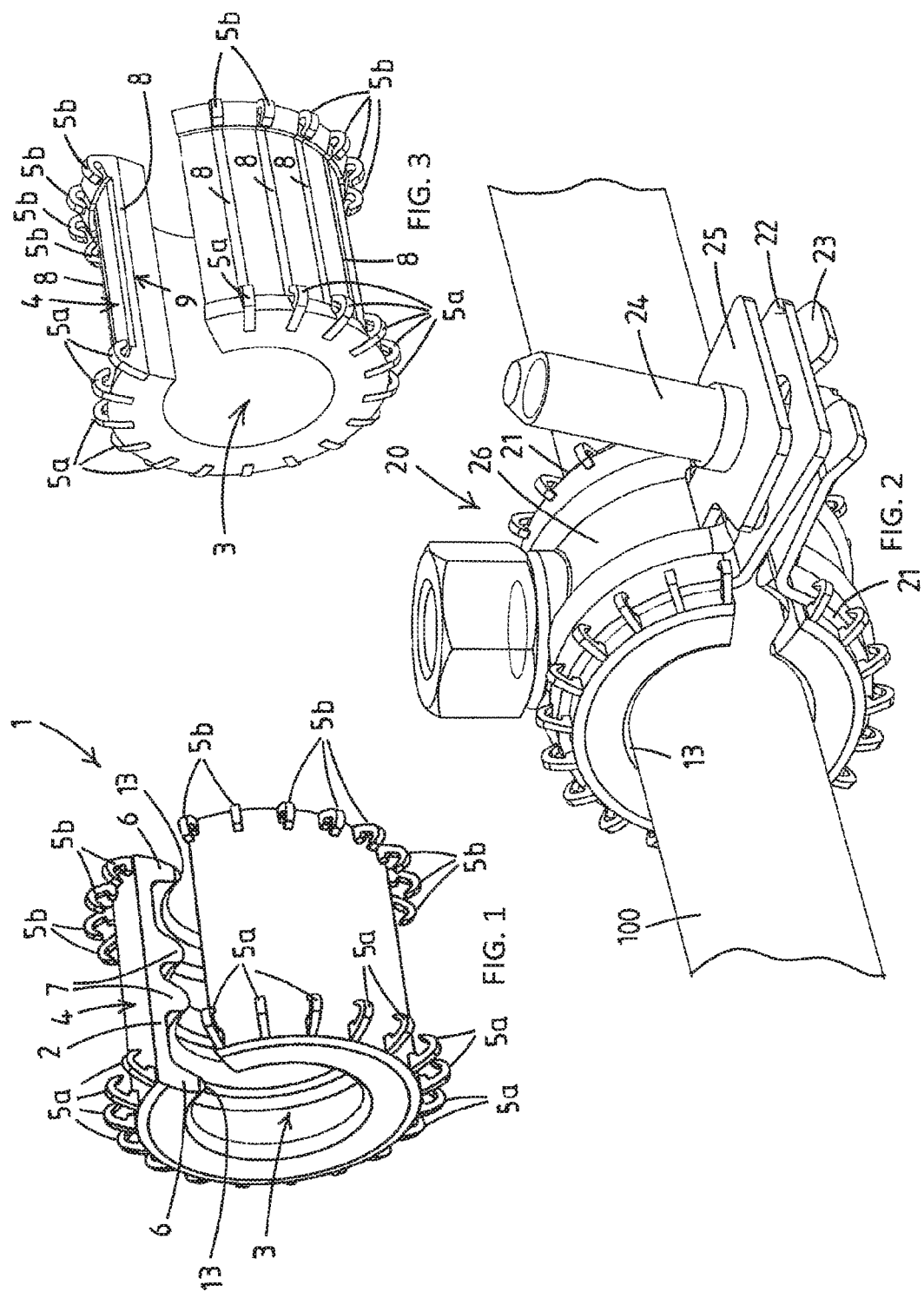

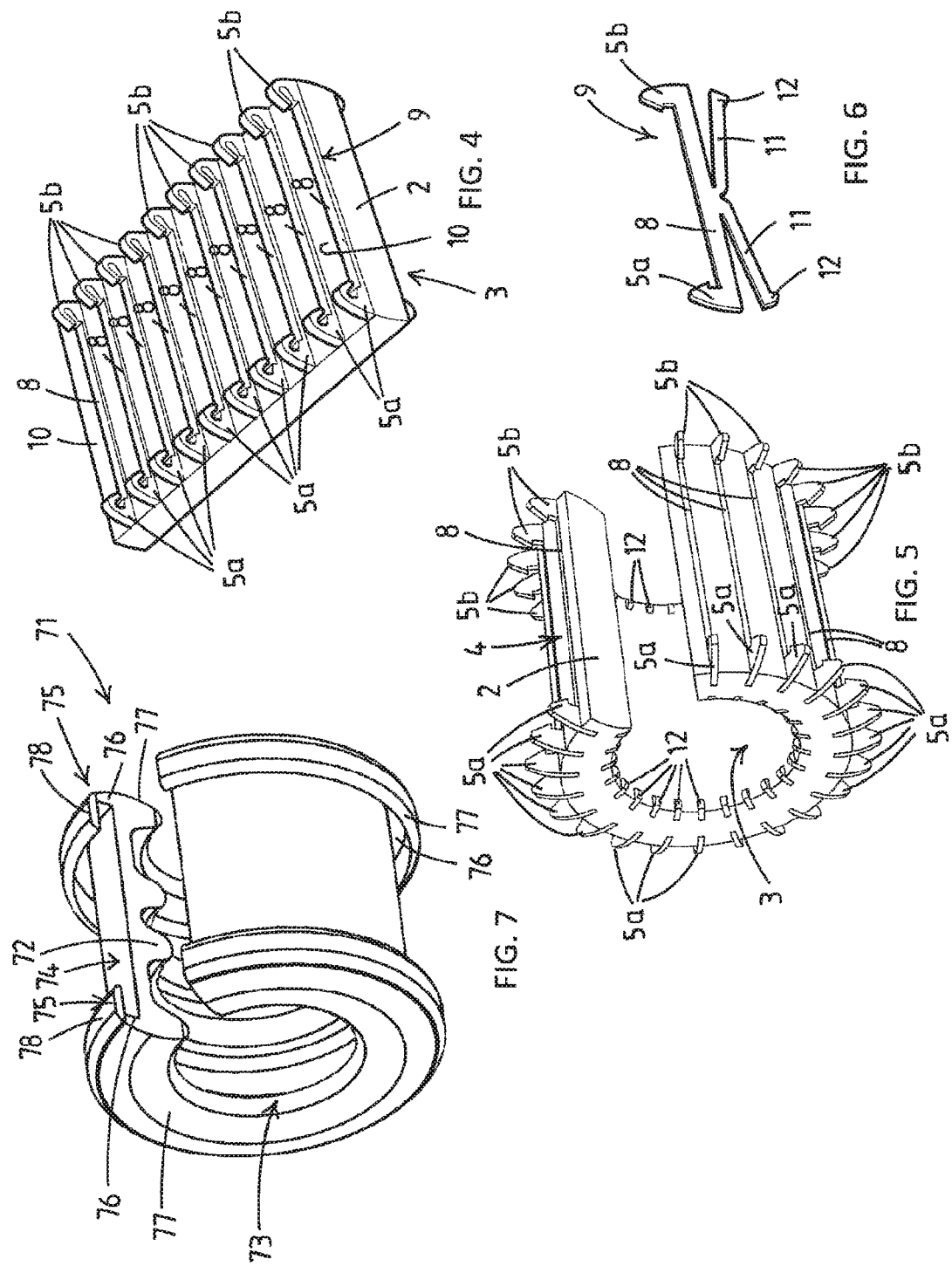

VIBRATION ISOLATING INSERT FOR A PIPE CLIP AND METHOD FOR MANUFACTURING SUCH AN INSERT

CROSS-REFERENCE TO RELATED APPLICATIONS

This application is the National Stage of International Application No. PCT/NL2015/050656 filed Sep. 21, 2015, which claims the benefit of Netherlands Application No. NL 2013596, filed Oct. 8, 2014, the contents of which is incorporated by reference herein.

FIELD OF THE INVENTION

The present invention relates to a vibration-isolating insert for a pipe clip, the vibration-isolating insert being adapted to bear against an inner circumference of a substantially annular pipe clip body and ultimately—in use—to be positioned between the outer circumference of a pipe and the pipe clip body, the vibration-isolating insert comprising an elongate strip of vibration-isolating material and having a pipe facing side and a pipe clip facing side.

BACKGROUND OF THE INVENTION

A known problem with vibration-isolating inserts in pipe clips is that during installation of pipes, the pipe slides through the pipe clip which is not yet entirely tightened around the pipe. The friction between the pipe surface and the insert may cause the insert to be pulled out of the pipe clip body.

EP 413 883 A1 discloses a vibration-isolating insert formed as a profiled strip having substantially a U-shaped cross section. The profiled strip has a base strip made of a soft material and lateral wall portions that in use extend beyond the lateral edges of the pipe clip body. The respective lateral wall portions have an end portion bent inwardly to grip around respective lateral edges of the pipe clip body. The lateral wall portions are made of a harder material than the base strip so as to provide a better anchoring of the vibration-isolating insert in the pipe clip body. A disadvantage of this known vibration-isolating insert is that it has a high resistance to bending and it is difficult to adapt to the annular shape of the pipe clip, especially when pipe clips for smaller pipe diameters are to be assembled.

The present invention has for an object to provide a vibration isolating insert that overcomes or at least mitigates the mentioned disadvantage.

SUMMARY OF THE INVENTION

This object is achieved by a vibration-isolating insert for a pipe clip, the vibration-isolating insert being adapted to bear against an inner circumference of a substantially annular pipe clip body and ultimately—in use—to be positioned between the outer circumference of a pipe and the pipe clip body, the vibration-isolating insert comprising an elongate strip of vibration-isolating material which has a pipe facing side and a pipe clip facing side, said strip of vibration-isolating material having adjacent either lateral edge thereof a series of discrete exposed hooks of plastics material which is more rigid than the vibration-isolating material, the hooks protruding relative to the pipe clip facing side of the strip of vibration-isolating material.

The respective series of discrete hooks along the lateral edge portions provide retaining means that in use engage around respective edges of the pipe clip body. The bending resistance in longitudinal direction is determined by the continuous part of the insert. Because the hooks are discrete items positioned at regular intervals, they have no or only a relatively small contribution to the bending resistance in the longitudinal direction of the insert. The bending resistance of the insert is thus mainly determined by the strip of vibration isolating insert, which is made from a "softer" material such as rubber or a thermoplastic elastomer.

In a possible embodiment two opposing hooks located on each of the lateral edge portions are interconnected by a connecting bridge of plastics material to form an integral hook unit. Preferably the integral hook unit is formed in one piece. The connecting bridge provides rigidity in the transverse direction between the two opposing hooks. Thereby the insert in the pipe clip is retained more secure in the pipe clip body.

In a possible embodiment said integral hook unit is interconnected with a previous and/or a subsequent integral hook unit by a flexible carrier strip, said carrier strip being attached to said strip of vibration-isolating material. Preferably the carrier strip is formed in one piece with the connecting bridges of said hook units.

The carrier strip is preferably substantially thinner than the connecting bridges. Thereby the low bending resistance of the vibration-isolating insert is warranted.

In a possible embodiment said connection bridge of said unit is, at least partly embedded in the vibration-isolating material of the strip. This results in that the hook unit is anchored firmly in the strip of vibration-isolating material.

In a particular embodiment the hook unit furthermore includes two legs connected with one end thereof to the bridge portion, preferably in a centre of the bridge portion, said legs each having at another end a pipe engagement protrusion, wherein the legs are embedded in the vibration-isolating material of the strip and the pipe engagement protrusions protrude outside the vibration-isolating material at the pipe facing side of the strip.

According to another aspect the invention relates to a vibration-isolating insert for a pipe clip, the vibration-isolating insert being adapted to bear against an inner circumference of a substantially annular pipe clip body and ultimately—in use—to be positioned between the outer circumference of a pipe and the pipe clip body, the vibration-isolating insert comprising an elongate strip of vibration-isolating material and having a pipe facing side and a pipe clip facing side, wherein the vibration-isolating insert has along each of the lateral edges at the pipe clip facing side a substantially L-shaped profile, the L-shaped profile having a first leg extending in alignment with the lateral side of the strip and a second leg extending from the first leg in a transverse direction, wherein the first leg is made of vibration isolating material and the second leg is made of a plastic material which is more rigid than the vibration-isolating material.

The insert according to this aspect has an L-shaped profile to grip around the pipe clip body, wherein the first leg of the L-shaped profile is made exclusively of vibration isolating material and the second leg is exclusively made of a more rigid plastic material. Thereby this vibration-isolating insert has a lower bending resistance than the known vibration-isolating insert of EP 413 883 A1, while the retaining force is increased with regard to inserts which are entirely made of vibration-isolating material.

The invention also relates to a pipe clip comprising an annular pipe clip body and a vibration-isolating insert as described in the above, wherein the vibration-isolating insert is arranged on the radially seen inner side of the pipe clip body.

The invention also relates to a method for manufacturing a vibration-isolating insert, the vibration-isolating insert being adapted to bear against an inner circumference of a substantially annular pipe clip body and ultimately—in use—to be positioned between the outer circumference of a pipe and the pipe clip body, said method including the following steps:

coextruding a continuous strip of vibration-isolating material, and a continuous strip of plastics material which is more rigid than the vibration-isolating material, wherein the strip of plastics material has a profiled section with hooks formed at the lateral sides, removing a transverse section of the strip of plastics material at constant intervals.

The transverse section of the strip of plastics material may advantageously be removed by punching. Another option is to remove the transverse section of the strip of plastics material by milling.

The transverse section of the strip of plastics material may be removed entirely. Another option is that the transverse section is removed to such an extent that a film layer of said plastic material remains. The latter has the advantage that the integrity of the vibration isolating strip can be warranted. Furthermore a better attachment of the vibration-isolating strip and the plastic parts can be expected.

The invention also relates to a method for manufacturing a vibration-isolating insert, the vibration-isolating insert being adapted to bear against an inner circumference of a substantially annular pipe clip body and ultimately—in use—to be positioned between the outer circumference of a pipe and the pipe clip body, said method including the following steps:

extruding a continuous strip of plastics material, wherein the strip of plastics material has a profiled section with hooks formed at the lateral sides, removing a transverse section of the strip of plastics material at constant intervals to such an extent that a film layer of said plastic material remains whereby a carrier strip with hook units at constant intervals is formed, feed the carrier strip to an extrusion device and extrude a strip of vibration-isolating material to a back of the carrier strip, wherein the vibration-isolating material is less rigid than the plastics material.

In this method the plastic part and the part made of vibration-isolating material, such as rubber or another elastomer, can be formed separately in separate moulds and then be brought together and fused or adhered to one another.

The invention also relates to a method for manufacturing a vibration-isolating insert, the vibration-isolating insert being adapted to bear against an inner circumference of a substantially annular pipe clip body and ultimately—in use—to be positioned between the outer circumference of a pipe and the pipe clip body, said method including the following steps:

forming hook units of plastics material, said hook units comprising two opposing hooks interconnected by a connecting bridge, providing a mould for moulding a strip of vibration-isolating material, positioning a plurality of said hook units in said mould at regular intervals, injecting vibration-isolating material in the mould whereby the connecting bridge of said hook units is at least partially embedded in the vibration-isolating material.

According to this method the vibration-isolating insert is made by so called "insert moulding", wherein the hook units are the inserts and the vibration-isolating material is injected around the inserts in the mould.

In a possible embodiment of the method the hook units are formed by injection moulding them of a plastics material. Another option is to form the hook units by punching them out of a sheet. It is conceivable to punch the hook units from another suitable material than plastic, e.g. metal, a composite or a paper based sheet.

The invention will be described in more detail in the following description with reference to the drawings.

BRIEF DESCRIPTION OF THE DRAWINGS

FIG. 1 shows a view in perspective of a possible embodiment of a vibration-isolating insert according to the invention, FIG. 2 shows a view in perspective of a pipe clip including the insert of FIG. 1 arranged around a pipe, FIG. 3 shows a view in perspective of another embodiment of a vibration-isolating insert according to the invention, FIG. 4 shows a view in perspective of yet another vibration-isolating insert in a straight strip form, FIG. 5 shows a view in perspective of yet another vibration-isolating insert according to the invention, FIG. 6 shows an insert used in the manufacturing of the insert of FIG. 5, and FIG. 7 shows a view in perspective of another vibration-isolating insert.

DETAILED DESCRIPTION OF THE INVENTION

In FIG. 1 is illustrated the general idea of a vibration-isolating insert with hooks. FIG. 1 shows a vibration isolating insert 1 in a bent fashion. The vibration-isolating insert 1 is fitted in the bent fashion in a pipe clip body, but is produced in a straight fashion. The insert 1 comprises an elongate strip 2 of vibration-isolating material. The strip 2 has a pipe facing side 3 and a pipe clip facing side 4. In the embodiment of FIG. 1 the pipe facing side 3 of the vibration isolating strip 2 is provided with longitudinal ribs 6 and 7.

Adjacent either lateral edge of the strip 2 a series of discrete exposed hooks 5a and 5b respectively of plastics material are arranged. "Discrete" means here that the hooks in the series are positioned more or less independent from each other. The interconnection of the hooks in a series is provided by the strip 2 of vibration isolating material to which they are attached and in some embodiments a thin plastic film as will be described below in relation to FIG. 4. "Exposed" means that the plastic hooks are not covered by or embedded in the vibration-isolating material.

The hooks 5a and 5b are protruding relative to the pipe clip facing side 4 of the strip 2 of vibration-isolating material. The plastic material of the hooks 5a, 5b is more rigid than the vibration-isolating material of the strip 2.

The vibration-isolating insert 1 is arranged in a pipe clip body 26 of a pipe clip 20 as is shown in FIG. 2. Such a pipe clip body 26 has a substantially annular shape and is preferably made of metal. The pipe clip body 26 has end flanges 22 and 23, which define a clip opening such that the clip body can be opened to arrange it around a pipe 100. The end flanges 22, 23 are tightened together by tightening means. The tightening means include a male fastening element 24, e.g. a screw and a female fastening element 25, e.g. a nut, which in use cooperate to tighten the flanges 22 and 23 together and tighten the pipe clip around the pipe 100.

In use the pipe clip facing side 4 of the strip 2 bears against an inner circumference of the pipe clip body 26. In use the insert 1 is positioned between the outer circumference of a pipe 100 and the pipe clip body 26. The hooks 5a, 5b grip around the lateral edges 21 of the pipe clip body 26.

The outer longitudinal ribs 6 of the vibration-isolating strip 2 are provided with a tip portion 13 that is made of a material of greater hardness than the vibration-isolating material of the strip 2. Thereby the friction between the pipe surface and the tip portion 13 of the ribs 6 is reduced. During installation of a pipe 100 in the pipe clip 20, the pipe clip is not yet fully tensioned and the pipe can slide with respect to the pipe clip 20 to put it in the desired position. The outer ribs 6 are preferably higher than the inner ribs 7, whereby the pipe surface will contact the tip portions 13 of the outer ribs. This makes movement between pipe and pipe clip insert 1 easier and reduces the risk of distortion of the insert 1, and even removal of the insert 1 from the pipe clip 20. When the pipe clip 20 is tightened around the pipe, the other ribs 7 and the further parts of the pipe facing side 3 come into engagement with the pipe surface.

In FIG. 3 an advantageous embodiment of a vibration-isolating insert according to the invention is shown. The general structure is the same as in FIG. 1 and the same features are thus indicated by the same reference numerals.

In the embodiment of FIG. 3 two opposing hooks 5a and 5b located at each of the lateral edges are interconnected by a connecting bridge 8 of plastics material to form an integral hook unit 9. The connection bridge 8 of said unit 9 is, at least partly embedded in the vibration-isolating material of the strip 2.

The hook units 9 can be formed of plastics material by a suitable method. The hook units can for example be formed by injection moulding. Alternatively the hook units may be punched out of a plastic sheet. Another possibility is to form a profiled section by a continuous process such as extrusion, and then cut of hook units 9 from the profiled section.

In a possible embodiment of the method a number of hook units 9 is positioned in a mould for moulding a strip of vibration-isolating material. The hook units 9 are positioned in the mould at regular intervals. Then vibration-isolating material is injected in the mould to form a strip 2 of vibration-isolating material whereby the connecting bridge 8 of said hook units 9 is at least partially embedded in the vibration-isolating material.

In FIG. 4 a further embodiment of a vibration-isolating insert is shown. In this figure the same features are indicated with the same reference numerals as in embodiments of FIGS. 1-3 and for a description of these features is referred to the above.

The embodiment of the vibration-isolating insert of FIG. 4 is shown in a straight fashion. Evidently it can be bent to fit it in a pipe clip body as is illustrated in FIG. 2.

The embodiment of FIG. 4 has hook units 9 each comprising a hook 5a and 5b interconnected by a connecting bridge 8. The consecutive hook units 9, that, seen in the longitudinal direction of the insert, are located at a mutual distance to each other, are interconnected by a carrier strip 10. The carrier strip 10 is in a preferred embodiment a plastic film which is formed in one piece with the hook units.

The integral carrier strip 10 with the hook units 9 can be formed by extruding a continuous strip of plastics material, wherein the strip of plastics material has a profiled section with hooks formed at the lateral sides. Next a transverse section of the strip of plastics material is removed at constant intervals to such an extent that a film layer of said plastic material remains. Thereby a carrier strip 10 with hook units 9 at constant intervals is formed.

The transverse section of the strip of plastics material may be removed by punching, or by milling.

The transverse section is removed to such an extent that a film layer of said plastic material remains.

The carrier strip 10 with the integral hook units 9 can be fed to an extrusion device. In the extrusion device a strip of vibration-isolating material, that is less rigid than the plastics material, is extruded to a back of the carrier strip 10, i.e. the side opposite the side where the hook units 9 are formed.

Alternatively a continuous strip of vibration-isolating material, and a continuous strip of plastics material which is more rigid than the vibration-isolating material are coextruded, wherein the strip of plastics material has a profiled section with hooks formed at the lateral sides. After the coextruded strip is cooled sufficiently a transverse section of the strip of plastics material at constant intervals is removed, thereby forming the hook units.

In this latter method it is possible to remove the transverse section to such an extent that a film layer of said plastic material remains, but it is also possible to remove the entire transverse section. In the latter case the hook units 9 are not connected by a plastic film.

It is also conceivable that a carrier strip 10 with integral hook units 9 and a strip 2 of vibration-isolating material are formed separately and are then joined by a suitable joining method, e.g. by means of an adhesive, or fusing the materials by heating them and then joining them.

It is also conceivable that the carrier strip 10 with integral hook units 9 is not made in one piece but is assembled from hook units 9 and a carrier strip from suitable carrier material, which may be different from the plastic material from the hook units 9. As a carrier material could for example be used a woven material, e.g. a woven fabric.

In FIG. 5 is shown another embodiment of a vibration-isolating insert. The same features are indicated with the same reference numerals as in the above described embodiments.

The vibration isolating insert of FIG. 5 has hook units 9 two opposing hooks 5a, 5b interconnected by a connecting bridge 8. The hook unit 9 is shown in FIG. 6. The connecting bridge 8 is embedded in the vibration-isolating material of the strip 2.

This embodiment can be manufactured by providing a mould for moulding a strip of vibration-isolating material, and positioning a plurality of said hook units in said mould at regular intervals. Then vibration-isolating material is injected in the mould whereby the connecting bridge 8 of said hook units 9 is at least partially embedded in the vibration-isolating material.

The hook units 9 can be formed by injection moulding them of a plastics material. An alternative is to form the hook units 9 by punching them out of a sheet of a suitable material, in particular plastic, although also other materials are conceivable, such as composites or metal.

The hook unit 9 in FIG. 6 has an additional feature compared to other hook units described in the above, which is that it furthermore includes two legs 11 connected with one end thereof to the bridge portion 8, preferably in a centre of the bridge portion 8. The legs 11 each have at another end a pipe engagement protrusion 12. The legs 11 are embedded in the vibration-isolating material of the strip as becomes clear from FIG. 5. The pipe engagement protrusions 12 protrude outside the vibration-isolating material at the pipe facing side 3 of the strip 2 as can be seen in FIG. 5.

The pipe engagement protrusions 12 have the same function as the longitudinal ribs on the inner side of the strip 2 in FIGS. 1 and 2. Because the material of the protrusions 12 is harder than the vibration-isolating material, the friction between a pipe surface and the insert is reduced. Thereby the pipe can during installation slide easier through the insert.

In FIG. 7 is shown another vibration isolating insert 71 for a pipe clip. The vibration-isolating insert 71 comprises an elongate strip 72 of vibration-isolating material and has a pipe facing side 73 and a pipe clip facing side 74. The vibration-isolating insert 72 has along each of the lateral edges at the pipe clip facing side a substantially L-shaped profile 75. The L-shaped profile has a first leg 76 extending in alignment with the lateral side 77 of the strip 72 and a second leg 78 extending from the first leg 76 in a transverse direction. The first leg 76 is made of vibration isolating material and the second leg 78 is made of a plastic material which is more rigid than the vibration-isolating material.

The invention claimed is:

1. A vibration-isolating insert for a pipe clip, the vibration-isolating insert being adapted to bear against an inner circumference of a substantially annular pipe clip body and ultimately—in use—to be positioned between an outer circumference of a pipe and the pipe clip body, the vibration-isolating insert comprising an elongate strip of vibration-isolating material which has a pipe facing side and a pipe clip facing side, said strip of vibration-isolating material having adjacent either lateral edge thereof a series of discrete exposed hooks of plastics material which is more rigid than the vibration-isolating material, the hooks protruding relative to the pipe clip facing side of the strip of vibration-isolating material.

2. The vibration-isolating insert according to claim 1, wherein opposing hooks of the series of discrete exposed hooks located at each of the lateral edges are interconnected by a connecting bridge of plastics material to form an integral hook unit.

3. The vibration-isolating insert according to claim 2, wherein said integral hook unit is formed in one piece.

4. The vibration-isolating insert according to claim 2, wherein said integral hook unit is interconnected with a previous or a subsequent integral hook unit by a flexible carrier strip, said carrier strip being attached to said strip of vibration-isolating material.

5. The vibration-isolating insert according to claim 2, wherein said integral hook unit is interconnected with a previous and a subsequent integral hook unit by a flexible carrier strip, said carrier strip being attached to said strip of vibration-isolating material.

6. The vibration-isolating insert according to claim 5, wherein the carrier strip is formed in one piece with the connecting bridges of said hook units.

7. The vibration-isolating insert according to claim 6, wherein the carrier strip is substantially thinner than the connecting bridges.

8. The vibration-isolating insert according to claim 2, wherein said connecting bridge of said unit is, at least partly embedded in the vibration-isolating material of the strip.

9. The vibration-isolating insert according to claim 8, wherein the hook unit furthermore includes two legs connected with one end thereof to the connecting bridge, said legs each having at another end a pipe engagement protrusion, wherein the legs are embedded in the vibration-isolating material of the strip and the pipe engagement protrusions protrude outside the vibration-isolating material at the pipe facing side of the strip.

10. The vibration-isolating insert according to claim 9, wherein the two legs of the hook unit are connected in a centre of the connecting bridge portion.

11. A pipe clip comprising an annular pipe clip body and a vibration-isolating insert, the vibration-isolating insert being arranged on a radially seen inner side of the pipe clip body, the vibration-isolating insert comprising an elongate strip of vibration-isolating material which has a pipe facing side and a pipe clip facing side, said strip of vibration-isolating material having adjacent either lateral edge thereof a series of discrete exposed hooks of plastics material which is more rigid than the vibration-isolating material, the hooks protruding relative to the pipe clip facing side of the strip of vibration-isolating material and extending around lateral edges of the pipe clip body.

12. A vibration-isolating insert for a pipe clip, the vibration-isolating insert being adapted to bear against an inner circumference of a substantially annular pipe clip body and ultimately—in use—to be positioned between an outer circumference of a pipe and the pipe clip body, the vibration-isolating insert comprising an elongate strip of vibration-isolating material and having a pipe facing side and a pipe clip facing side, wherein the vibration-isolating insert has along each of the lateral edges at the pipe clip facing side a substantially L-shaped profile, the L-shaped profile having a first leg extending in alignment with the lateral side of the strip and a second leg extending from the first leg in a transverse direction, wherein the first leg is made of vibration isolating material and the second leg is made of a plastic material which is more rigid than the vibration-isolating material.

13. The vibration-isolating insert according to claim 12, wherein the first leg of the L-shaped profile is made exclusively of vibration isolating material and the second leg is exclusively made of a more rigid plastic material.

14. A pipe clip comprising an annular pipe clip body and a vibration-isolating insert, the vibration-isolating insert being arranged on a radially seen inner side of the pipe clip body, the vibration-isolating insert comprising an elongate strip of vibration-isolating material and having a pipe facing side, a pipe clip facing side and lateral sides, wherein the vibration-isolating insert has along each of the lateral sides at the pipe clip facing side a substantially L-shaped profile, the L-shaped profile having a first leg extending in alignment with the lateral side of the strip and extending beyond a lateral edge of the pipe clip body, and a second leg extending from the first leg in a transverse direction that grips around said lateral edge of the pipe clip body, wherein the first leg is made of vibration isolating material and the second leg is made of a plastic material which is more rigid than the vibration-isolating material.

* * * * *